United States Patent [19]

Povlick et al.

[11] Patent Number: 4,532,406
[45] Date of Patent: Jul. 30, 1985

[54] ARC WELDING TORCH HAVING INTEGRATED WIRE FEED

[75] Inventors: Thomas P. Povlick, Clifton Park; Richard M. Lund, Scotia, both of N.Y.

[73] Assignee: General Electric Company, Schenectady, N.Y.

[21] Appl. No.: 579,046

[22] Filed: Feb. 10, 1984

[51] Int. Cl.³ .............................................. B23K 9/16
[52] U.S. Cl. ................. 219/124.34; 219/75; 219/136
[58] Field of Search .............. 219/124.34, 136, 74, 219/75

[56] References Cited

U.S. PATENT DOCUMENTS

| 2,496,347 | 2/1950 | Herbst | 219/74 |
| 2,791,673 | 5/1957 | Arnaud | 219/74 |
| 3,053,968 | 9/1962 | Gorman et al. | 219/74 |
| 3,832,520 | 8/1974 | Glasser | 219/136 |
| 3,940,586 | 2/1976 | Stearns et al. | 219/136 |
| 4,450,339 | 5/1984 | Corby, Jr. | 219/124.34 |

Primary Examiner—Clifford C. Shaw
Attorney, Agent, or Firm—Donald R. Campbell; James C. Davis, Jr.; Paul R. Webb, III

[57] ABSTRACT

A compact gas tungsten arc welding torch, which may have an integral puddle view optical system, utilizes an inert gas supply line and coolant supply and return lines, one carrying current for the weld process. The torch body has passages for flow of cover gas from a connection tube to the gas nozzle. The gas supply hose additionally carries the filler wire for the weld process, which passes into the gas connection tube and out of the torch body to an integral wire feed guide tube that is alternatively inside or outside of the gas nozzle.

7 Claims, 6 Drawing Figures

4,532,406

ARC WELDING TORCH HAVING INTEGRATED WIRE FEED

BACKGROUND OF THE INVENTION

This invention relates to arc welding apparatus and to an improvement in filler wire feeding that does not increase the bulk size of the welding torch.

While performing gas tungsten arc welding (GTAW) in which a gap exists between the objects to be welded, a filler material is introduced into the weld puddle. Previously this had been performed manually by the welder, feeding a short length wire into the vicinity of the weld puddle. With the advent of automated welding equipment, continuous wire feeders are now being used. They consist of an additional flexible hose used to deliver the wire, a mounting bracket external to the torch, and a short length of semi-flexible tubing from the bracket to the vicinity of the weld puddle. The torch already has a water supply line and return line, one of which supplies current for the weld process, and a cover gas supply line, and the additional filler wire hose needlessly adds to the problems associated with routing the hoses to the torch. More importantly the separate bracket adds an unacceptable bulkiness to the torch. With this type configuration, many welds cannot be performed due to mechanical interference between parts and the torch. There is also a greater possibility of mechanical damage to the torch, parts, or fixtures.

The improved method of introducing the welding wire to the weld puddle and compact GTAW torch are disclosed in the context of a robotic welding torch with an integral vision sensor to directly view the weld puddle and structured light pattern. Several commonly-assigned copending applications cover various features of the integrated optics. One of these, Ser. No. 528,753, filed Sept. 1, 1983, A. W. Case, Jr. and D. C. Peroutky, "Gas Metal Arc Welding Torch with Vision System", describes an integral wire feed contact tube screwed into a dog leg on the torch body and has a completely separate inert gas system.

SUMMARY OF THE INVENTION

An object of the invention is to provide a method of filler wire feeding which uses the existing supply lines and calls for only a small modification of an arc welding torch.

Another object is to provide improved TIG and MIG welding torches with a wire feed that does not require the addition of any external mechanical parts to the torch and increasing its overall width or diameter.

In an arc welding torch including a torch body having a gas fitting and passages for cover gas flow from a supply hose to the gas nozzle, and other passages for coolant flow from a supply line to a return line, one of which conducts electrical current for the weld process to the torch body, the improved method of delivering welding wire to the weld puddle comprises passing the welding wire through the gas supply hose and connection tube and out of the torch body to a wire guide integrated with the torch.

The gas tungsten arc welding torch previously described is modified to include the integral wire feed guide, typically a small diameter substantially nonconductive tube supported on the shroud to which the gas cup is attached. One configuration is that the wire guide is on the inside of the gas cup and an alternative provides the wire guide close to the outside of the gas cup.

DETAILED DESCRIPTION OF THE INVENTION

Figure 1:
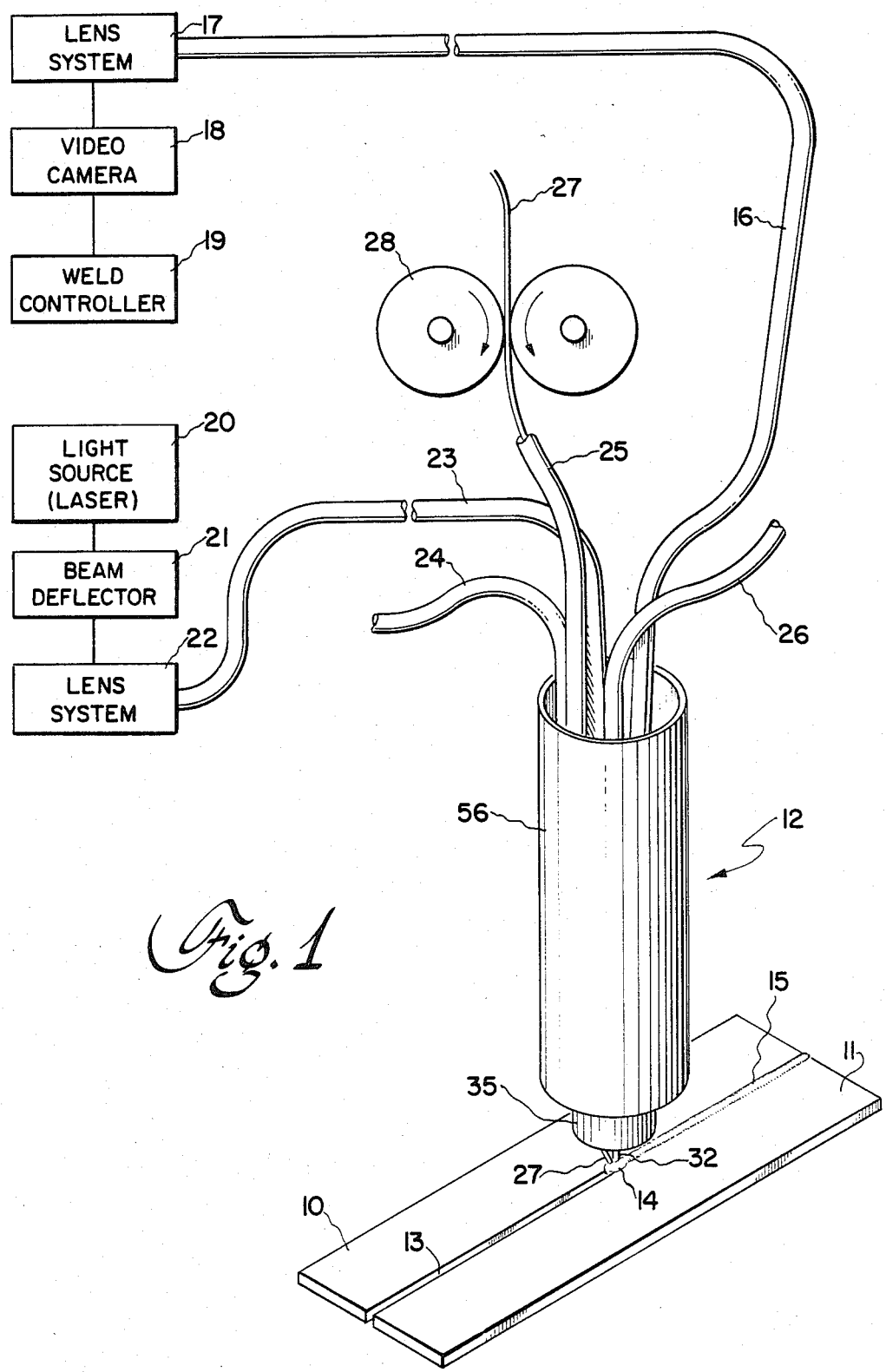
FIG. 1 shows seam welding with a gas tungsten arc welding torch having a vision sensor and improved filler wire feed.

In FIG. 1, workpieces 10 and 11 are seam welded by a TIG (tungsten inert gas) arc welding torch 12 that automatically tracks the joint and has two integral optical systems to project a structured light pattern onto the joint 13 near the weld puddle and to directly view the weld region. The weld puddle 14 and remelt zone 15, the joint and structured light pattern, typically two parallel or concentric stripes, are imaged on the face of a coherent fiber optic bundle 16 by which the image is transferred to a remotely located control system. The image is magnified by a lens system 17 and sent to a video camera 18 such as General Electric's TN2500 Charge Injection Device Camera; the video output is fed to a computerized weld controller 19 and used in a feedback arrangement to control welding parameters and move the torch for centering the weld puddle over the seam. The remote components of a programmable light pattern projection system are a light source 20, generally a laser, forming a narrow beam that is directed to a two-dimensional beam deflector 21. The deflected beam is imaged by a lens system 22 onto the entrance of a second coherent fiber optic bundle 23 and traces out the light pattern which is transferred along the flexible bundle to the welding torch. More information on the integrated optics is given in application Ser. No. 554,512, filed Nov. 23, 1983, N. R. Corby, Jr., R. M. Lund, and D. C. Peroutky, "Arc Welding Torch with Two Integral Optical Systems".

The water/electrical power supply line 24, inert cover gas supply line 25, and water return line 26 plus the flexible fiber optic cables 16 and 23 are made to exit away from the weld area. By this invention, the gas supply hose 25 is used to additionally carry the wire 27 for the weld process. The filler wire is fed through the supply line into welding torch 12 by two driven rollers 28 or a commercially available feed mechanism which controls its rate of feed. Also the GTAW torch is modified to include an integral wire feed guide tube. The cover gas supply line 25, usually made of soft plastic, is modified by the addition of a steel lining to prevent the wire from puncturing through the plastic. The gas pressure may be increased so as to maintain the desired flow rate as without the wire 27.

Figure 2:
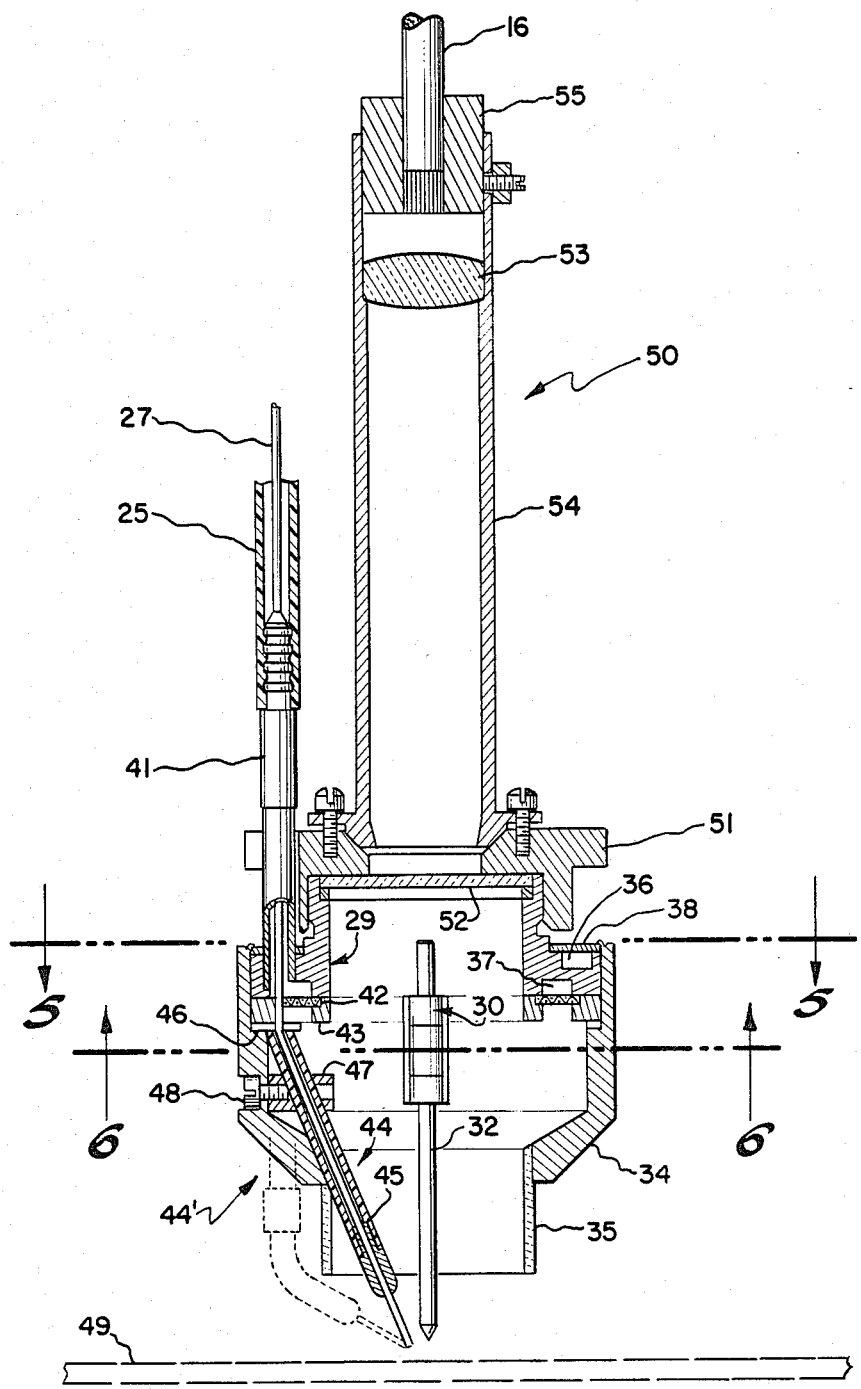
FIG. 2 is a vertical cross section through the welding torch and integral optical vision system to view the weld puddle.
Figure 3:
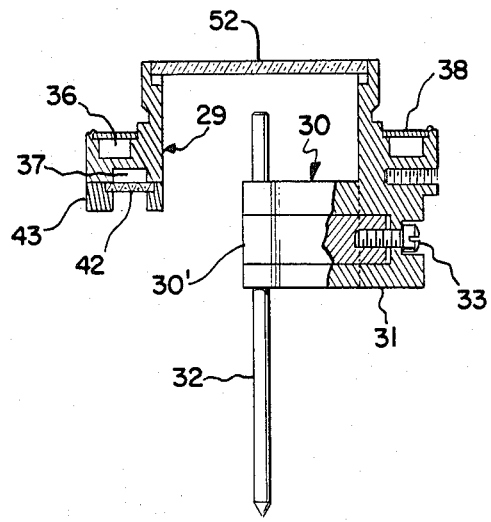
FIG. 3 is a cross section through the ring-shaped torch body taken at 90° to FIG. 2 to illustrate the slim profile electrode holder.

Referring to FIGS. 2 and 3, the torch body 29 is similar in configuration and function to that described in the above and in application Ser. No. 401,471, filed July 26, 1982, now U.S. Pat. No. 4,488,032 A. W. Case, Jr., N. R. Kuchar and D. C. Peroutky, "Arc Welding Torch with Integral Vision Sensor". The torch body 29 is an electrically conducting, copper ring having an inwardly projecting, integral, slim profile electrode holder 30. A downwardly projecting dog leg 31 on the torch body supports two stationary radial arms between which is a movable center arm 30'. Nonconsumable tungsten electrode 32 is inserted through rings at the ends of the arms and is clamped by turning a lock screw 33. The lower end of torch body 29 is seated in a metal shroud ring 34 to which is attached a gas nozzle or cup 35.

Figure 5:
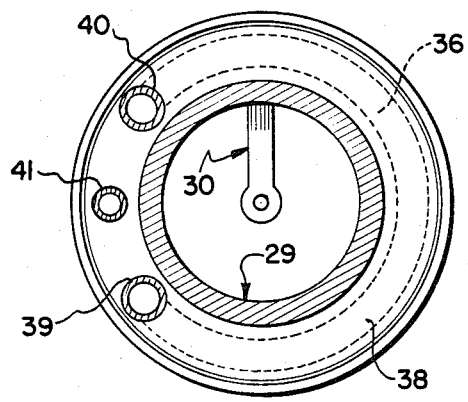
FIGS. 5 and 6 are horizontal cross sections through the torch taken approximately on lines 5—5 and 6—6 in FIG. 2.
Figure 4:
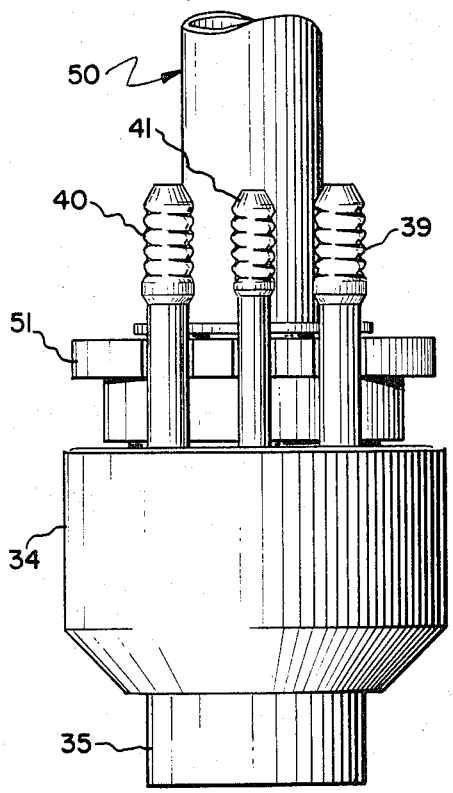
FIG. 4 is a partial side view of the torch showing the coolant, electrical power, and cover gas connection tubes, the latter carrying the wire for the weld process.
Figure 6:
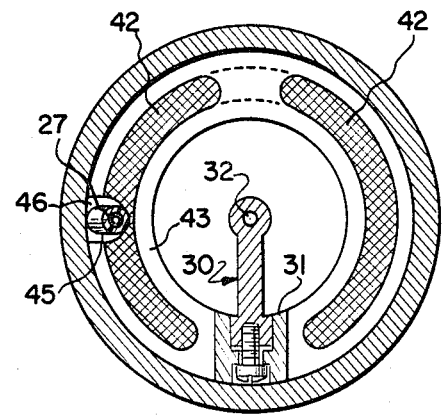

The ring-shaped torch body 29 has passages 36 and 37 for coolant and cover gas flow; the first in the upper part of the torch body is enclosed by a cover 38. Referring also to FIGS. 4 and 5, three copper tubes 39–41 are the coolant, electrical power, and gas connections or fittings, and are inserted into holes in the top of torch body 29 and soldered. Coolant enters one end of passage 36 through copper tube 39 and exits at the other end through tube 40, one of which connects to a metal braid jacket hose (24 in FIG. 1) to conduct electrical current to the torch for the weld process in addition to water or other coolant, as is conventional in the art. The cover gas is typically argon, or other inert gas or mixture of inert gases. It is fed through gas supply hose 25 and connection tube 41 to passage 37 in the bottom of the torch body. The inert cover gas exits through a gas lens 42 (see FIG. 6) and through shroud 34 and gas cup 35 to purge the weld region of air. The gas lens consists of a permeable barrier of alternate layers of fine wire mesh which produce a stable stream of shielding cover gas. By focussing the gas into a coherent stream, the covering ability of the shielding gas is effective at greater gas cup to workpiece distances than is possible without the lens. A gas lens cover 43 is screwed to the bottom of the torch body and has arcuate slots for cover gas flow into the shroud.

The welding wire 27 is made of the same material as the workpiece or a compatible material. The filler wire is passed through gas supply hose 25 (FIG. 2) into the gas fitting 41 and through fine holes in the torch body 29 and gas lens cover 43. Other than these holes, the only modification made is that the torch includes an integral wire feed guide 44 to carry the wire feed to the vicinity of the electric arc and weld puddle. The preferred configuration provides the wire guide on the inside of gas cup 35, and the alternative provides it on the outside of the gas cup.

Wire guide 44 is comprised of a tube 45 supported on shroud 34 whose upper end is aligned with the hole in gas lens cover 43. A seal 46 may be provided to minimize escape of cover gas. The tubing is electrically isolated from the body of the torch, since the torch is at weld potential. It is nonconductive or made of a material such as stainless steel that is substantially nonconductive. Wire guide tube 45 is inserted through a hole in a metal block 47 secured by a screw 48 to the inside of the shroud 34. The alternative configuration shown in dashed lines is that wire feed guide tube 44' passes through a hole in the metal shroud 34 and is close to the outside of gas cup 35, curving inwardly past the lower end of the gas cup to the vicinity of the arc established between electrode 32 and the workpiece 49. The wire feed guide 44 or 44' is located such that the filler wire is fed to a specific location in front or 45° to either side of electrode 32 during the welding operation. This method of wire feeding and the modified welding torch does not require the addition of any external mechanical parts to the torch, which would increase the bulk size of the torch and increase its overall width or diameter.

Only an integral puddle view optical vision system 50, which is almost directly above the welding electrode 32, is visible at the cross section location in FIG. 2. The exit optical assembly of the laser light pattern projection system is behind and is inclined at a small angle to the torch electrode axis. Both are supported by a cap 51 on torch body 29 which serves as platform, and the weld puddle and workpiece are viewed through the center of the ring-shaped torch body. Metal cap 51 is held in place by screws and secures a transparent, heat reflecting window 52 which isolates the optics from the cover gas and prevents gas flow in any direction except out through the gas nozzle.

The viewing optical system 50 is composed of a lens 53 which images the weld puddle and weld area on the entrance end of fiber optic bundle 16. The slim profile electrode holder is located sufficiently far from the optical focus region at the weld puddle to provide minimum optical distortion on the face of the fiber optic bundle. The welding wire guide tube 45 is seen in the image but it is at a location where it does not matter too much. Lens 53 is, for instance, a doublet or triplet and is mounted in a cylindrical metal lens housing 54. The fiber optic bundle 16 is adjustable to focus the image of the weld region on the face of the cable. The end of the cable is inserted into an insulating plug 55 that is slidable inside the lens housing and held in place by a screw. The torch body 29, shroud 34 and metal viewing optics components are at weld potential and protected by an insulating jacket 56 (FIG. 1).

The improved method of wire feeding is anticipated to have wide application in automated arc welding equipment. The integrated wire feed system is for manual as well as robotic torches, including those without a vision sensor in the torch assembly and those that have a built-in vision sensor but no integrated light pattern projector. A MIG (metal inert gas) arc welding torch with an integrated welding wire feed is provided by removing the electrode holder and substituting a metal wire guide tube for nonconductive wire guide 44 or 44'.

While the invention has been particularly shown and described with reference to preferred embodiments thereof, it will be understood by those skilled in the art that various changes in form and details may be made therein without departing from the spirit and scope of the invention.

What is claimed is:

1. A robotic arc welding torch comprising:
   an electrically conductive torch body having a cover gas connection tube to supply cover gas to first internal passages in said torch body and hence to a gas nozzle to purge the weld region of air, and coolant connection tubes to supply and return coolant that flows in second internal passages in said torch body, one of said coolant connection tubes conducting electrical current for the weld process to said torch body and to an electrode holder for securing an electrode;
   a gas supply hose on said first-mentioned connection tube;
   a shroud supporting said torch body and gas nozzle; and
   integral wire guide means for carrying to the vicinity of the arc a filler wire that passes through said gas hose and connection tube and out of said torch body.

2. The welding torch of claim 1 wherein said wire guide means is a substantially nonconductive tube supported at the inside of said gas nozzle.

3. The welding torch of claim 1 wherein said wire guide means is a substantially nonconductive tube supported close to the outside of said gas nozzle.

4. The welding torch of claim 1 wherein said torch has an integral optical vision system whose axis is approximately aligned with said electrode and which views the weld puddle and provides an image to a remote controller.

5. A robotic gas tungsten arc welding torch comprising:

a ring-shaped, electrically conductive torch body having thereon a cover gas connection tube to supply cover gas to first passages in said torch body and hence to a gas nozzle, and coolant connection tubes to supply and return coolant that flows in second passages in said torch body, one of said coolant connection tubes conducting electrical current for the weld process to said torch body and to a slim profile inwardly projecting electrode holder that holds a tungsten electrode;

a shroud supporting said torch body and gas nozzle;

an integral optical vision system which views the workpiece and weld puddle through the center of said ring-shaped torch body and provides an image to a remote controller; and an integral wire feed guide tube for carrying to the vicinity of the arc a filler wire that is passed through said gas connection tube and torch body.

6. The welding torch of claim 5 wherein said wire guide is a small diameter substantially nonconductive tube supported on said shroud at the inside of said gas nozzle.

7. The welding torch of claim 5 wherein said wire guide is a small diameter substantially nonconductive tube supported on said shroud close to the outside of said gas nozzle.

* * * * *